US012617543B1

(12) United States Patent
Tavcar et al.

(10) Patent No.: US 12,617,543 B1
(45) Date of Patent: May 5, 2026

(54) WING COOLING SYSTEM FOR FUEL CELL

(71) Applicant: Pipistrel d.o.o., Ajdovscina (SI)

(72) Inventors: Gregor Tavcar, Ljubljana (SI); Blaz Mocan, Ljubljana (SI)

(73) Assignee: Pipistrel d.o.o., Ajdovscina (SI)

( * ) Notice: Subject to any disclaimer, the term of this patent is extended or adjusted under 35 U.S.C. 154(b) by 0 days.

(21) Appl. No.: 18/938,204

(22) Filed: Nov. 5, 2024

(51) Int. Cl.
| | |
|---|---|
| *B64D 33/08* | (2006.01) |
| *B64D 27/31* | (2024.01) |
| *B64D 27/355* | (2024.01) |
| *H01M 8/04007* | (2016.01) |
| *H01M 8/04029* | (2016.01) |

(52) U.S. Cl.
CPC .............. *B64D 33/08* (2013.01); *B64D 27/31* (2024.01); *B64D 27/355* (2024.01); *H01M 8/04029* (2013.01); *H01M 8/04067* (2013.01); *H01M 2250/20* (2013.01)

(58) Field of Classification Search
CPC .......... B64D 27/355; B64D 2013/0614; B64D 33/08; B64U 20/90; B64U 20/98
See application file for complete search history.

(56) References Cited

U.S. PATENT DOCUMENTS

| | | | | |
|---|---|---|---|---|
| 2,330,632 | A | * 9/1943 | Seligman | ............... B64D 33/10 |
| | | | | 165/44 |
| 5,702,073 | A | * 12/1997 | Fluegel | ................... F28F 13/00 |
| | | | | 165/44 |

| | | | | |
|---|---|---|---|---|
| 9,698,435 | B2 | 7/2017 | Klewer et al. | |
| 11,306,976 | B2 | 4/2022 | Bishop | |
| 11,597,528 | B2 * | 3/2023 | Villanueva | ............. B64D 27/31 |
| 11,724,810 | B2 * | 8/2023 | Haruki | ................... B64D 13/08 |
| | | | | 165/53 |
| 11,912,425 | B2 * | 2/2024 | Wagner | ................. B64D 27/31 |
| 2019/0300182 | A1 | 10/2019 | Knapp et al. | |
| 2023/0159174 | A1 * | 5/2023 | Baxter | ................. B64D 27/357 |
| | | | | 244/55 |
| 2024/0043132 | A1 * | 2/2024 | Law | ................... H01M 8/04029 |
| 2024/0166358 | A1 | 5/2024 | Zuzelski et al. | |

OTHER PUBLICATIONS

Habermann, A. et al., "Aerodynamic Effects of a Wing Surface Heat Exchanger," Aerospace 2023, Apr. 27, 2023, 25 pages.

Schaefer, S. et al., "Integration of a Cooling System Architecture with a Skin Heat Exchanger for High Thermal Loads in Fuel Cell Powered Aircraft," 19th International Refrigeration and Air Conditioning Conference at Purdue, School of Mechanical Engineering, Jul. 10-14, 2022, 12 pages.

* cited by examiner

*Primary Examiner* — Nicholas McFall

(74) *Attorney, Agent, or Firm* — SLATER MATSIL, LLP

(57) ABSTRACT

An aircraft, including a wing having an exterior with an exterior surface, a first power supply structure disposed in the wing, an electric motor electrically connected to the first power supply structure, a first heat exchanger disposed in the wing, where the first heat exchanger is disposed adjacent to, and in thermal contact with, at least a portion of the exterior of the wing, where the first heat exchanger is configured to transfer heat to the exterior surface, and a first coolant pump in fluid communication with the first heat exchanger and the first power supply structure.

17 Claims, 10 Drawing Sheets

WING COOLING SYSTEM FOR FUEL CELL

TECHNICAL FIELD

The present invention relates generally to a system and method for providing a cooling system for a power supply device, and in particular, for an in-wing heat exchanger system for cooling fuel cells in the wing of an aircraft.

BACKGROUND

Recent aircraft development has focused on providing more efficient power systems to power lightweight drones, passenger aircraft, and the like. Many of these developments have focused on alternative power systems using fuel cell technology, electric drive trains, and the like. Similar to internal combustion engines (ICEs), alternative power systems produce not only useful work but also waste heat. However, the challenges of removing this waste heat from alternative power systems are significantly different and often more complex than those faced by ICEs.

For instance, although fuel cell systems typically produce less waste heat per unit of useful work due to their higher efficiency, they require larger cooling systems than ICEs. This is because ICEs expel most of their waste heat as hot exhaust gases. In contrast, fuel cell systems operate at much lower temperatures (typically below 100° C.), resulting in exhaust gases that do not exceed this temperature. Consequently, the amount of waste heat expelled by fuel cell systems as hot exhaust gases is minimal. Additionally, since fuel cell systems operate at lower temperatures, all heat transfer occurs at smaller temperature differences from the ambient environment, necessitating larger surface areas for heat exchange.

Another example is batteries. While they operate at even higher efficiencies than fuel cells and produce even less waste heat per unit of useful work, they must function at even lower temperatures (typically below 40° C.). This results in even smaller or almost negligible temperature differences to the ambient environment, requiring even larger surface areas for heat exchange.

Rejecting heat to the ambient through large surface areas may, in some instances, require incorporating large radiators, which may add significant drag to an aircraft. Since minimizing drag is a crucial aspect of aircraft design, reducing the additional drag caused by the cooling requirements of alternative power systems is a topic of great interest.

Alternative power systems tend to require support features that more traditional internal combustion engines (ICEs) do not require, or require these support features on a smaller scale. Additionally, the alternative power systems tend to have a lower power-to-weight and lower power-to-volume ratio than ICE powered vehicles with similar performance. Thus, alternative power systems tend to be heavier, and bulkier, than traditional vehicle power systems.

However, as development of alternative power systems improves, the weight and range of those systems improves, improving the attractiveness of alternative power systems. In particular, fuel cell and battery-powered electric aircraft become more cost effective when the weight of the power systems is improved while keeping or improving range. Notably, the power required for fuel cell or battery-powered electric aircraft results in high current draws that frequently need active cooling. This active cooling tends to be directed to cooling of both, the sources of electric power such as fuel cells or battery systems and the sinks of electric power, such as electric drive motors. Therefore, improvements to cooling of fuel cell or battery power systems of aircraft reduce the weight of the power systems or reduce the drag of a cooling system, improving the range and efficiency of aircraft powered by fuel cell or battery based electric propulsion systems.

Fuel cells or batteries tend to generate heat when used. Fuel cells generate heat as a byproduct of generating electricity from the catalyzation of fuel, while batteries tend to heat up when charged or discharged, with more heat being generated when more current is drawn. Providing sufficient current to electric propulsion motors, and to providing a useful travel range requires the use of a fairly large number of fuel cells or batteries, and running a large number of fuel cells or batteries in an enclosed area, such as a vehicle, requires substantial cooling for the batteries in order for the batteries to operate efficiently and safely. Additionally, cooling the batteries extends the lifetime of the fuel cells or batteries. Thus, cooling fuel cells or batteries during use is a critical feature of electric powered vehicles.

SUMMARY

An embodiment aircraft includes a wing having an exterior with an exterior surface, a first power supply structure disposed in the wing, an electric motor electrically connected to the first power supply structure, a first heat exchanger disposed in the wing, where the first heat exchanger is disposed adjacent to, and in thermal contact with, at least a portion of the exterior of the wing, where the first heat exchanger is configured to transfer heat to the exterior surface, and a first coolant pump in fluid communication with the first heat exchanger and the first power supply structure.

An embodiment cooling system includes a first power supply structure, a first heat exchanger having a first inner portion configured to be disposed adjacent to a first portion of a wing exterior of a wing configured for use in flight of an aircraft, the wing having a wing exterior with an exterior surface, where the first inner portion at least partially bounds a first fluid cavity, and where the first power supply structure is in fluid communication with the first fluid cavity, and a first coolant pump configured to pump first coolant through the first fluid cavity to the first power supply structure, where pumping first coolant through the first fluid cavity causes the first heat exchanger to cool the first coolant.

An embodiment method includes providing cooling for an aircraft power system of an aircraft by causing a coolant pump to pump coolant along a coolant flow path, where pumping coolant along the coolant flow path includes moving, using the coolant pump, the coolant from a power supply structure to a heat exchanger, where the heat exchanger is disposed in a wing of the aircraft, and is in thermal contact with an exterior of the wing, moving the coolant through the heat exchanger, where moving the coolant through the heat exchanger cools the coolant and transfers heat in the coolant to the exterior surface for removal by airflow over the wing, and moving the coolant, after cooling the coolant, to the power supply structure.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Embodiments of the principles presented herein provide for a cooling system for power supply structures, such as fuel cells or batteries, of an aircraft, which may also be used for electric propulsion systems. In particular, the cooling system is a liquid cooling system using the exterior or skin of aircraft surface as part of a radiator or heat exchanger. In some embodiments, the cooling system may be provided in the wing of an aircraft proximate to a fuel cell or battery to provide cooling for fuel cells or batteries while reducing the system cost and weight compared to cooling systems that are remote from the elements being cooled. While the embodiments described herein may be described in terms of cooling for fuel cells, the cooling system may be used with any power supply structure, such as batteries, hydrogen cells, electrical fuel cells, or the like.

Using the exterior of the aircraft for cooling reduces the cooling drag of fuel cell aircraft since traditional radiators, cooling fins, heat exchangers, or the like can be avoided. Additionally, routing hot coolant to a wing surface assists in de-icing. Having the cooling and fuel cells stored in the wing moves the weight of fuel cell stands to the wings from the fuselage which reduces the required wing strength, and the use of non-cuboid fuel cell stacks permits improved use of wing volumes.

Figure 1A:
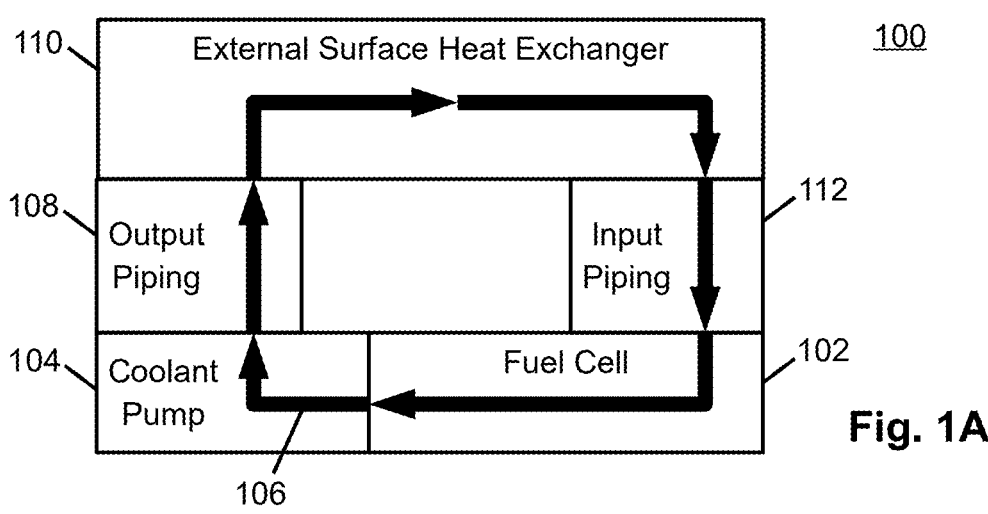
FIGS. 1A-1C are logical diagrams illustrating arrangements for fuel cell cooling systems according to some embodiments.
Figure 1B:
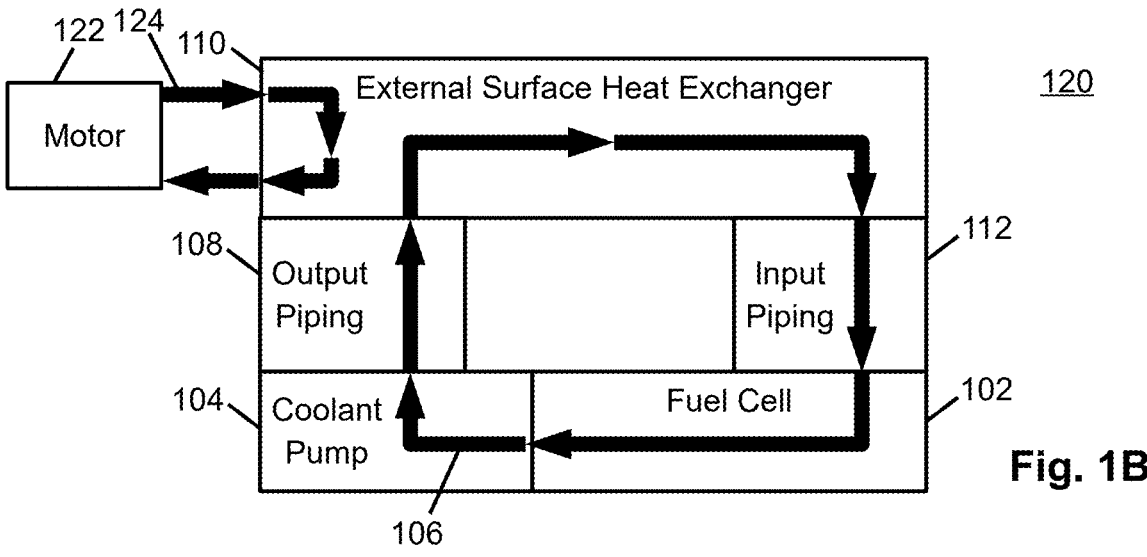
Figure 1C:
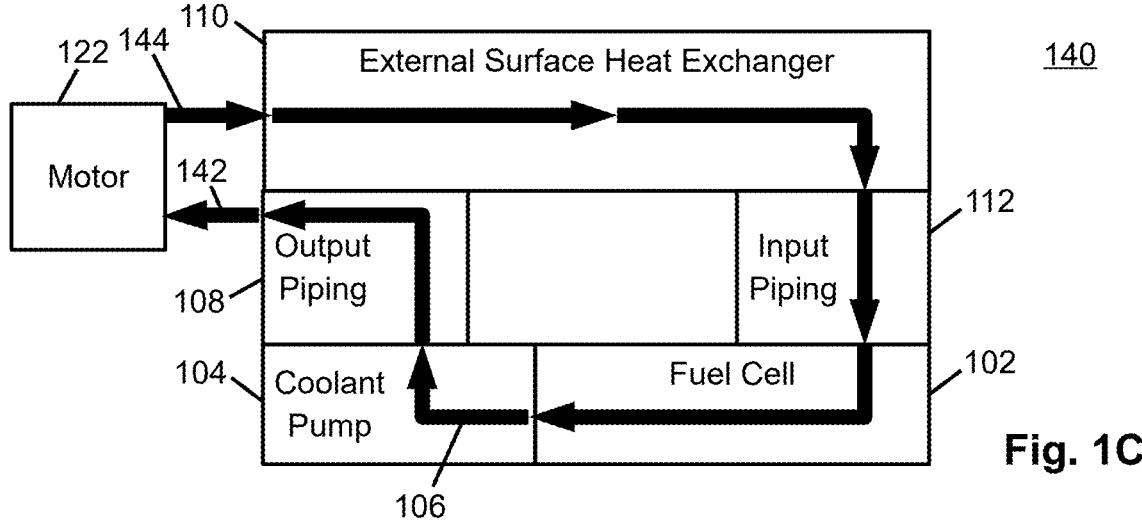

FIGS. 1A-1C are logical diagrams illustrating arrangements for fuel cell cooling systems according to some embodiment. FIG. 1A is a logical diagram illustrating an arrangement for a fuel cell cooling system 100 according to some embodiments. A fuel cell cooling system 100 may provide a coolant flow path 106 between one or more fuel cell 102 stacks and an external surface heat exchanger 110. The fuel cell 102 may be electrically connected to a motor, and may be used for providing electrical power to the motor for powering flight. In some embodiments, the coolant may be a liquid, such as ethylene glycol, water, an alcohol or oil, or another fluid used for heat transfer. Coolant may be circulated through a closed loop fluid flow path 106 by a coolant pump 104. In some embodiments, the coolant pump 104 may be disposed between a fuel cell 102 and a heat exchanger 110, and may, in some embodiments, be in fluid communication with the heat exchanger 110 by output piping 108. Input piping 112 may connect the heat exchanger 110 to the fuel cell 102 to provide coolant to an input of the fuel cell 102.

The heat exchanger 110 may be a housing with a cavity that accepts coolant pumped from the fuel cell 102 via the output piping 108 by the coolant pump 104, and that allows the coolant to cool before being circulated back to the fuel cell. The heat exchanger is in thermal contact with an exterior of the vehicle. In some embodiments, the heat exchanger 110 is adjacent to, or forms part of, an external surface of a vehicle. In some embodiments, the vehicle is an aircraft, and the heat exchanger 110 is disposed adjacent to, or forms part of, the exterior surface of a fuselage, wing, or the like. Providing the heat exchanger 110 near, or at, for example, the wing, provides airflow to cool coolant being pumped through the heat exchanger 110.

While not shown, the system 100 may also have a controller that monitors temperatures of the wing exterior surfaces, fuel cells 102, coolant, motors, or the like, and adjusts coolant flow based on measured temperatures. Thus, the cooling system may be adjusted to control the amount of heat delivered from the fuel cells 102 by the coolant to the wing exterior surfaces to control cooling of the fuel cells 102 or motor, and to control heat at the wing skin for managing de-icing or ice prevention on the wing surface. Additionally, in systems with multiple fuel cell 102 stacks and multipole cooling systems, cooling of individual fuel cell 102 stacks may be adjusted individually. For example, in a system where one wing is in sunlight and one wing is shaded, the wing receiving greater solar radiation may need greater coolant flow due to a reduced cooling capacity at the hotter side.

In some embodiments, the exterior skin of the wing may form part of the heat exchanger 110 so that fluid in a cavity of the heat exchanger 110 efficiently transfers heat to the exterior of the aircraft. In other embodiments, the heat exchanger 110 has a first wall that forms a cavity of the heat exchanger 110, and that is in thermal contact with a skin or exterior structure of the wing so that heat is transferred from the heat exchanger 110 to the exterior of the wing and is removed by airflow over the wing as the airplane flies and air flows over the wing. For example, a wall of the heat exchanger 110 may have an outside surface that is bonded, riveted, attached, glued, or otherwise connected to the exterior structure, such as a wing skin, of the aircraft. In some embodiments, a thermal transfer material may be disposed between the exterior of the heat exchanger 110 and may improve heat transfer between the heat exchanger 110 and the exterior structure. In embodiments where the heat exchanger 110 is disposed in an aircraft wing, the exterior structure may be a metal wing skin formed from one or more layers, and in some embodiments, may be aluminum, titanium, an alloy, or the like. In other embodiments, the wing skin may be one or more layers of a polymer or composite, such as carbon fiber, fiberglass, or the like, and may be modified for improved heat transfer.

In some embodiments, the heat exchanger 110 may provide a fluid flow path 106 along the interior of the wing for fluid flow along at least a portion of the interior surface of the exterior structure. For example, the heat exchanger 110 may be connected to the output piping 108 near one end or edge of a wing, and the coolant pump 104 may provide coolant through the output piping 108 through the heat exchanger 110 to another end or edge of the wing to extend the time coolant is in contact with heat absorbing surfaces of the heat exchanger 110. In some embodiments, coolant may be provided to the heat exchanger 110 at a leading edge of a wing, and may flow away from the leading edge, toward a trailing edge, so that air flowing over the wing during flight, for example, increases the coolant exposure to the exterior surface of the heat exchanger 110 or heat exchange surface to improve cooling of the coolant.

FIG. 1B is a logical diagram illustrating a parallel arrangement for a fuel cell and motor cooling system 120 according to some embodiments. In some embodiments, the fuel cell cooling system 120 may integrate cooling for a motor 122. In particular, the cooling system 120 may have a second, motor coolant flow path 124. In some embodiments, the motor 122 may have a pump system or other system for sending coolant through the motor coolant flow path 124 through the heat exchanger 110. In some embodiments, the coolant circulating through the motor coolant flow path 124 may be separate from coolant of coolant flow path 106, so that cooling for the fuel cells 102 and motor 122 is separate. In other embodiments, the motor coolant flow path 124 and flow path 106 for the fuel cells may be joined, so that coolant flowing through the motor 122 and fuel cells 102 is interchanged. This may permit the coolant pump 104 to send coolant through both the motor 122 and fuel cells 102, reducing the number of coolants pumps 104 needed, simplifying the system 120. Thus, some coolant may flow into the motor 122 and to the heat exchanger 110 through the motor coolant flow path 124, while some coolant flows through the flow path 106 through the fuel cells 102, through the coolant pump 104 and output piping 108 to the heat exchanger 110 where it is cooled, then on to the input piping 112 and back to the fuel cells 102.

FIG. 1C is a logical diagram illustrating a series arrangement for a fuel cell cooling system 140 according to some embodiments. In some embodiments, the cooling system 140 may have the motor 122 disposed along the coolant flow path, with the motor 122 in series with the fuel cells 102. In some embodiments, the coolant circulating through the motor 122 is directed along the coolant flow path 106 by, for example, the output piping 108, or by other features. The coolant is provided to the motor 122 along a motor coolant input path 142 and from the motor 122 to the heat exchanger 110 or another part of the cooling system 140 by a motor coolant output path 144 so that cooling for the fuel cells 102 and motor 122 is combined.

Figure 2A:
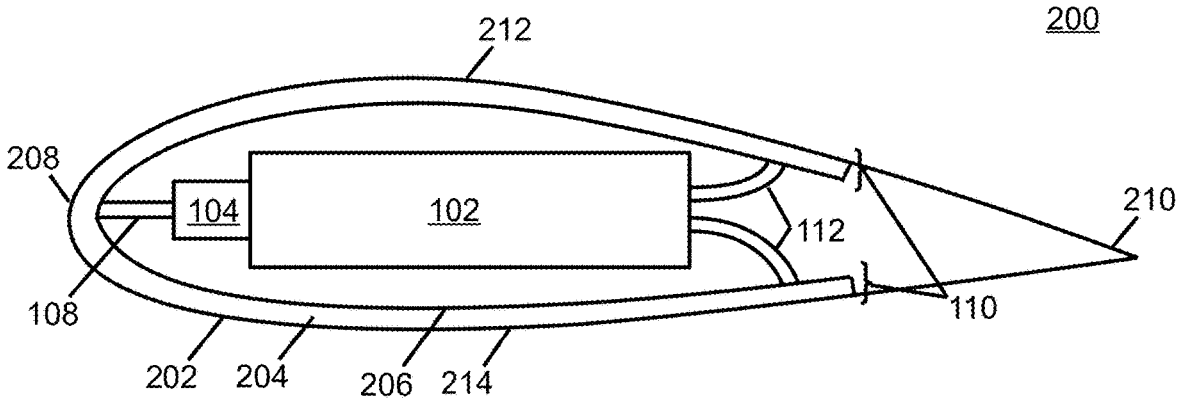
FIGS. 2A-2C are diagrams illustrating wing assemblies with fuel cell cooling systems according to some embodiments.
Figure 2B:
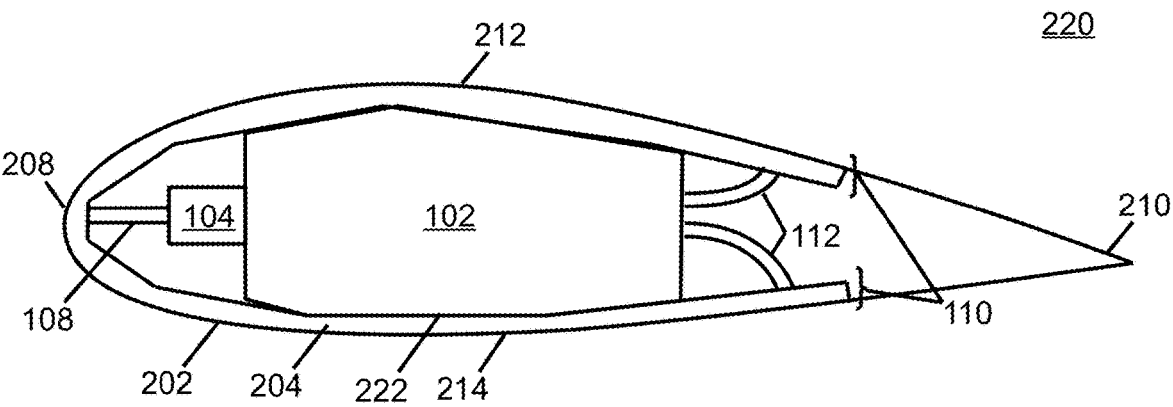
Figure 2C:
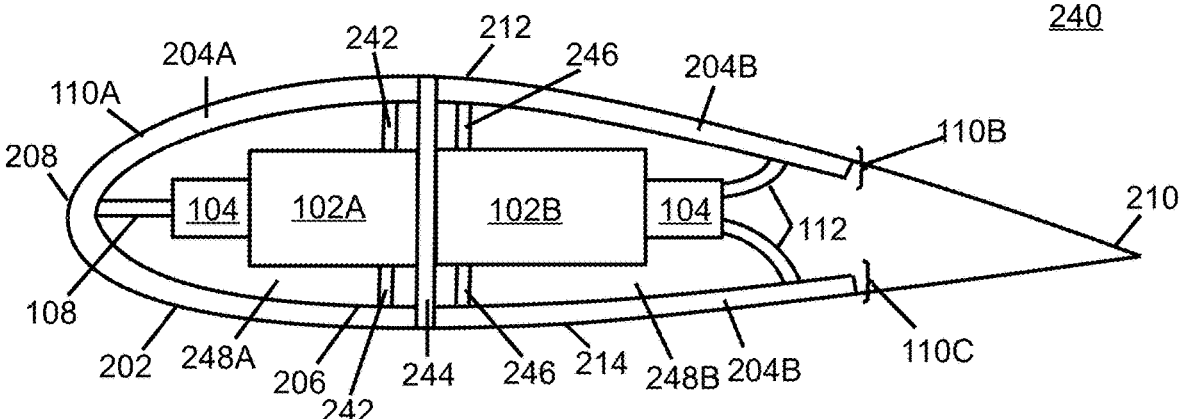

FIGS. 2A-2C are diagrams illustrating wing assemblies 200, 220, 240 with fuel cell cooling systems according to some embodiments. FIG. 2A is a diagram illustrating a side view of a wing assembly 200 with a fuel cell cooling system according to some embodiments. In some embodiments, a heat exchanger 110 may be disposed along an interior surface of an exterior 202 of a wing, and may extend at least partially along an upper side 212 of the wing, along a leading edge 208 of the wing, and along at least a portion of the lower side 214 of the wing. The wing may have a wing skin, structure, or set of layered materials that form the exterior 202 of the wing, and have an exterior surface that is in contact with airflow during aircraft flight. In some embodiments, the exterior 202 of the wing may form the outer surface of the heat exchanger 110. In other embodiments, the heat exchanger 110 may have a separate outer surface that is adjacent to the exterior 202 of the wing. Forming the heat exchanger 110 separately from the exterior structure of the wing, and bonding or disposing the heat exchanger 110 to the exterior 202 of the wing for transfer of heat from the heat exchanger 110 to the wing exterior surface may simplify construction of the wing since the heat exchanger 110 may be formed outside of the wing. However, forming the heat exchanger 110 with the exterior 202 skin, structure or layers as the outer portion, or wall, of the heat exchanger 110 may reduce the complexity and weight of the heat exchanger 110 due to reduced part count.

The heat exchanger 110 may further have an inner portion 206 that bounds a fluid cavity 204 and defines the interior or inside boundary of the heat exchanger 110. In some embodiments, the inner portion 206 has coolant openings aligned with the output piping 108 and input piping 112 to permit coolant flow between the piping and the fluid cavity 204. In some embodiments, the inner portion 206 may be bonded, for example by riveting, adhesive, welding, or the like, to an interior surface of the exterior 202 of the wing. In other embodiments, the inner portion 206 may be attached to an exterior portion of the heat exchanger 110, with the exterior portion of the heat exchanger 110 directly or indirectly contacting the exterior 202 of the wing.

In some embodiments, heat may be transferred from the heat exchanger 110 by conduction due to direct connect between the heat exchanger 110 and one or more layers of the wing exterior 202, or by indirect contact between the heat exchanger 110 outer surface and the wing exterior 202, by, for example, a heat transfer material contacting the heat exchanger 110 and exterior 202 of the wing.

In some embodiments, the wing may be substantially hollow or free of interior support, or have minimal support structures such as spars, wing beams, or the like. The hollow wing permits the fuel cells 102 to be disposed in the wings, or in wing cavities, which moves the weight of the fuel cells or batteries to the wings, reducing the load on the wing due to the fuselage weight, reducing structural support requirements. This permits the wing to be a non-dry wing, where the wing carries the mass, but allows reduction in wing structure since the wing supports less weight from the fuselage during flight. Additionally, a cooling system and associated fuel cells 102 disposed within the wing permits reduced cooling plumbing and hardware since output piping 108 and input piping 112 may be relatively short since the piping does not extend from the fuselage into the wing.

In some embodiments, the output piping 108 may connect the coolant pump 104 to a portion of the heat exchanger 110 that is near, adjacent to, or located at, the leading edge 208 of the wing. Input piping 112 may connect the fuel cell 102 to a portion of the heat exchanger near the trailing edge 210 of the wing. In some embodiments, the heat exchanger 110 may have a fluid cavity 204 through which coolant flows, and the fluid cavity 204 may be substantially contiguous from the output piping 108 to the input piping 112. Additionally, in some embodiments, the fluid cavity 204 may extend from a bottom portion of a wing forming the lower side 214 of the wing, around the leading edge 208, to a top portion of the wing forming the upper side 212 of the wing. Thus, the heat exchanger 110 and fluid cavity 204 form a heat exchanger cavity by extending around at least a portion of the fuel cell 102, the coolant pump 104, the output piping 108, or the input piping 112. Additionally, in some embodiments, the heat exchanger 110 may terminate, in the longitudinal direction, before the trailing edge 210, with the heat exchanger 110 extending from the leading edge 208 partially along the wing.

FIG. 2B is a diagram illustrating a side view of a wing assembly 220 with a fuel cell cooling system and prismatic fuel cell 102 according to some embodiments. Since the fuel cells 102 are disposed within an unused space within a wing, the fuel cells 102 may be shaped to fill parts of a wing, and may, for ease of construction, have prismatic surface 222, with facets or other shapes that conform to an interior surface of the wing, or the inner portion 206 of the heat exchanger 110. Thus, the heat exchanger 110 may have a prismatic interior shape on the inner portion 206 or surfaces forming the heat exchanger cavity, and the fuel cells may have a shape that conforms to the interior surface of the heat exchanger cavity. In some embodiments, the fuel cell 102 may have an outer surface that conforms to the interior surface of the heat exchanger cavity, and may extend, in at least portions of the heat exchanger cavity, completely between interior walls of the heat exchanger cavity. The remainder of the heat exchanger cavity and wing cavity may provide space for the output piping 108, input piping 112, coolant pump 104, or other features. Notably, while the fuel cells 102 may have a shape that conforms to the inner portion 206 of the heat exchanger, the fuel cells 102 may be spaced apart from the inner portion 206 of the heat exchanger to ensure that the fuel cell 102 remains unloaded, or without structural stress, to avoid the fuel cells 102 requiring certification of the strength or physical properties of the fuel cells 102 for as a structural part of the wing.

FIG. 2C is a diagram illustrating a side views of a wing assembly 240 with a split fuel cell cooling system according to some embodiments. In some embodiments, a wing may have a support structure 244 such as a spar, beam, stringers, tubing, trusses, or the like, that run from a wing root near the fuselage, spanwise toward a wing tip. The production considerations or structural features of a support structure may require that the fuel cells 102A, 102B not extend through the support structure 244. Thus, a power system may use a first fuel cell 102A and second fuel cell 102B that may be connected together, or that may be electrically separated. In some embodiments, the first fuel cell 102A may be in front of the support structure 244, or between the leading edge 208 and the support structure 244. The second fuel cell 102B may be behind the support structure 244, or between support structure 244 and the trailing edge 210.

In some embodiments, both fuel cells 102A, 102B and the accompanying coolant pumps 104, output piping 108, split input piping 242, split output piping 246 and input piping 112 are disposed in the wing cavity and within first heat exchanger cavity 248A and second heat exchanger cavity 248B. In order to avoid interfering with the support structure 244, and to provide separate or sequestered cooling for each fuel cell 102A, 102B, a system may have a first heat exchanger 110A and a separate second heat exchanger 110B. Separation of the heat exchangers 110A, 110B for each fuel cell 102A, 102B provide redundancy in the case that a heat exchanger 110A, 110B or fuel cell 102A, 102B fails, in case of a bird strike damaging a cooling system, or the like. The first heat exchanger 110A may be associated with a first fuel cell 102A, may be disposed in front of the support structure 244, and may be connected to the first fuel cell 102A by a coolant pump 104, output piping 108 and split input piping 242. The first heat exchanger 110A may have a first fluid cavity 204A separate from a second fluid cavity 204B. The first heat exchanger 110A may extend around the leading edge and along both the upper side 212 and lower side 214 toward the support structure 244 to form the first heat exchanger cavity. Since coolant flows along both the upper and lower portions of the first heat exchanger 110A, split input piping 242 may be used to separately connect the upper portion of the first heat exchanger 110A to the fuel cell 102A and the lower portion of the first heat exchanger 110A to the fuel cell 102A. Thus, the first heat exchanger 110A may have a single first fluid cavity 204A, with an upper portion of the of the first fluid cavity 204A adjacent to the upper surface 212 of the wing contiguous with a lower portion of the first fluid cavity 204A extending along the lower side 214 of the wing. The coolant then passes through a coolant opening 406 in the inner portion of the heat exchanger, through the split input piping 242 back to the coolant pump 104.

The second heat exchanger 110B may be disposed in the second heat exchanger cavity 248B and may be effectively split into an upper portion that extends along and adjacent to the upper surface 212 of the wing and a lower portion that extends along an and adjacent to the lower side 214 of the wing. In some embodiments, the second heat exchanger 110B may extend only partially to the trailing edge 210 and stop before the trailing edge 210 so that the upper portion and lower portion of the second heat exchanger 110B are separate and have separate cavities. In other embodiments, the upper portion and lower portion of the second heat exchanger 110B may connect, for example, by extending to, or near the trailing edge 210 to form a contiguous second fluid cavity 204B. The upper portion and lower portion of the second heat exchanger 110B may be disposed on opposing sides of the cooling system, including the second fuel cell 102B, the split output piping 242, coolant pump 104 and input piping 112. In some embodiments, the upper and lower portions of the second heat exchanger 110B at least partially bound a second heat exchanger cavity.

Figure 3A:
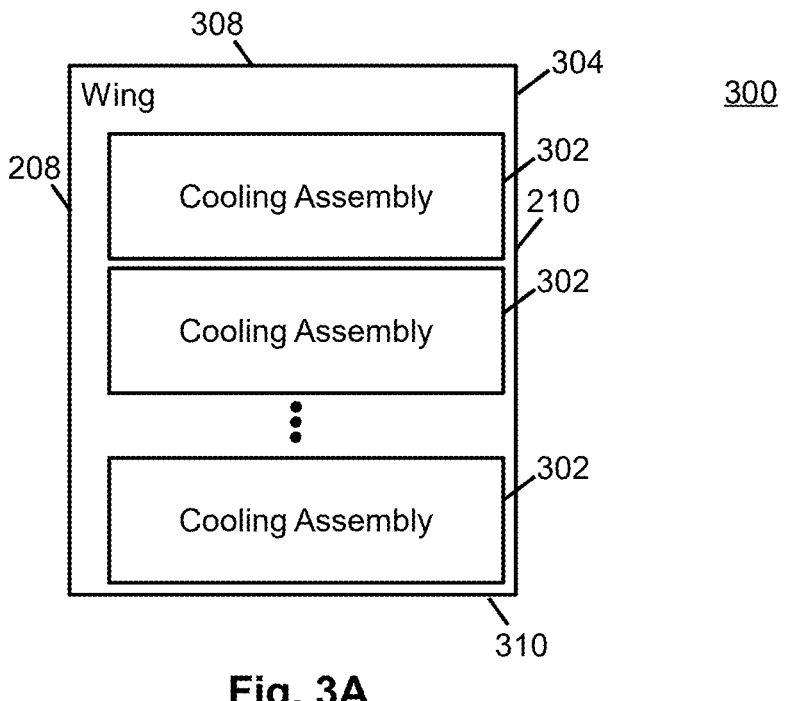
FIGS. 3A-3B are diagrams illustrating wing arrangements with multiple cooling assemblies according to some embodiments.
Figure 3B:
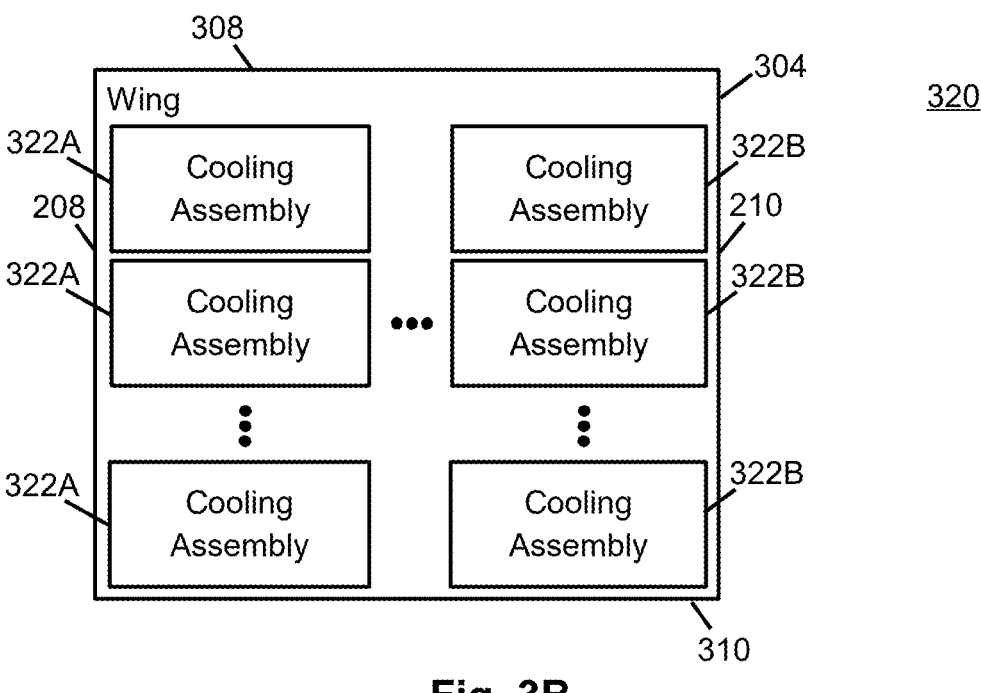

FIGS. 3A-3B are diagrams illustrating wing arrangements 300, 320 with multiple cooling assemblies 302, 322A, 322B according to some embodiments. FIG. 3A is a diagram illustrating a wing arrangement 300 with multiple cooling assemblies 302 according to some embodiments. A cooling assembly arrangement may include multiple cooling assemblies 302, with each cooling assembly 302 having an associated heat exchanger, one or more associated fuel cells and associated piping, coolant pump, and the like. Providing each fuel cell or set of fuel cells with a separate dedicate heat exchanger and related piping, pump and the like, permits segregation of cooling systems so that coolant flow may separately controlled, and shut down independently if a system of fuel cell fails.

Thus, in some embodiments, a system may have a plurality of cooling assemblies 302, and they may be arranged in a wing 304 spaced apart in a lateral direction that extends from a wing root 310 to a wing tip 308. In some embodiments, the cooling assemblies 302 may be arranged in a single row, with the cooling assemblies 302 arranged singly in a longitudinal direction extending from the leading edge 208 of the wing to the trailing edge 210 of the wing.

FIG. 3B is a diagram illustrating a wing arrangement 320 with multiple rows with multiple cooling assemblies 322A, 322B according to some embodiments. In some embodiments, for example, where a wing 304 has a support structure, the wing 304 may have multiple rows of cooling assemblies 322A, 322B, with the rows spaced apart in a longitudinal direction from the leading edge 208 to the trailing edge 210. Additionally, in some embodiments, the wing 304 may have multiple rows, with a first row with first cooling assemblies 322A that are spaced apart in a lateral direction from the wing root 310 to the wing tip 308, and a second row of second cooling assemblies 322B that are between the first cooling assemblies 322A and the trailing edge 210 of the wing. While the system is illustrated with two rows of cooling assemblies 322A, 322B, any number of rows may be used based on system requirements.

Figure 4:
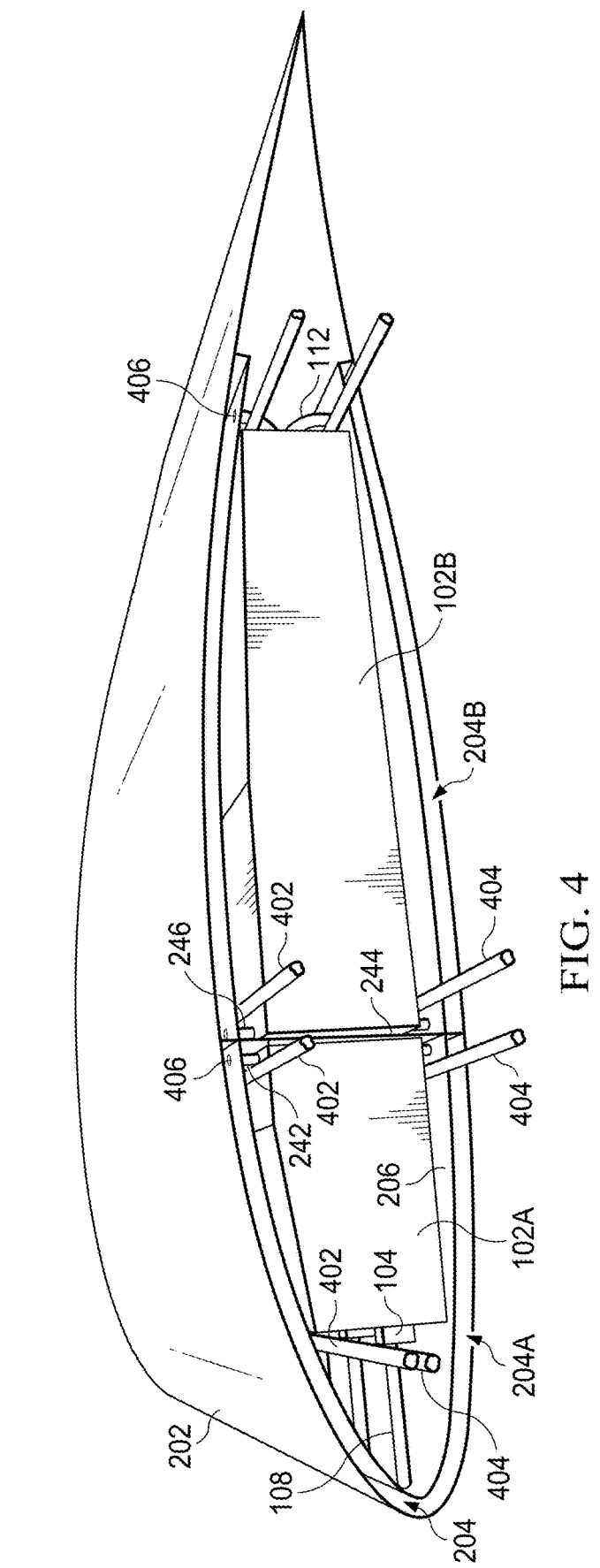
FIG. 4 is a diagram illustrating a perspective view of a wing structure with a fuel cell cooling system according to some embodiments.

FIG. 4 is a diagram illustrating a perspective view of a wing structure 400 with a fuel cell cooling system according to some embodiment. In some embodiments, the wing structure 400 has a split fuel cell system, with a first fuel cell 102A and a second fuel cell 102B separated by a support structure 244. The wing has an inner portion 206 of heat exchangers spaced apart from the exterior 202 of the wing, and a first inner portion of a first heat exchanger is disposed between the leading edge of the wing and the support structure 244, and forms a first fluid cavity 204A. A second heat exchanger has a second inner portion disposed between the support structure 244 and the trailing edge of the wing, and forms a second fluid cavity 204B. The first fuel cell 102A is disposed in a first heat exchanger cavity formed by the first inner portion of the heat exchanger and is at least partially surrounded by the first fluid cavity. The coolant pump 104 connects the first fuel cell 102A to the first fluid cavity 204A near the leading edge of the wing by way of the first output piping 108. The coolant pump 104 sends coolant into the first fluid cavity 204A neat the leading edge, and the coolant flows through the first fluid cavity 204A along the interior side of the exterior of the wing so that heat may be transferred to air outside of the wing. In some embodiments, the coolant flows rearward toward the trailing edge, and flows through a coolant opening 406 in the inner portion 206 to the split input piping 242 back through the first fuel cell 102A.

The second fuel cell 102B and associated cooling system performs similarly. The coolant pump 104 for the second fuel cell 102B pumps coolant through the second fuel cell 102B, and then through the split output piping 246 to the second fluid cavity 204B. As the second fluid cavity 204B extends from the support structure 244 toward the trailing edge, and in the illustrated embodiment, stops prior to the trailing edge without the upper and lower portions of the second fluid cavity 204B connecting to each other, the coolant may be split between the upper and lower portions of the second fluid cavity 204B to pass along the upper and lower exterior surfaces of the exterior of the wing to transfer heat to outside air. The coolant then passes through coolant openings 406 in the inner portion 206 of the heat exchanger, through input piping 112, and back to the coolant pump. In other embodiments, the coolant pump may be disposed between the second fuel cell 102B and the output piping or split output piping 246, or anywhere else in the coolant flow path depending on design considerations.

In some embodiments, space in the wing cavity may be used for routing for wiring, plumbing, or other physical features for using, controlling, or interacting with the fuel cells 102A, 102B or cooling systems. In some embodiments, the system may have piping, such as supply piping 402 and exhaust piping 404 that carries fuel to the fuel cells 102A, 102B, or removes exhaust or waste products from the fuel cells 102A, 102B. The supply piping 402 and exhaust piping 404 may be routed to the fuel cells 102A, 102B through the wing cavity and within the first or second heat exchanger cavities. For example, the supply piping 402 may route fresh air that is collected in a fuselage mounted air intake and compressed to the fuel cells 102A, 102B for use in generating power. The exhaust piping 404 may route exhaust products resulting from fuel cell power generation, such as waste gases, water vapor, and the like, to an exhaust or outlet for storage or discharge from the aircraft.

Additionally, while not shown, the system may have wiring or other features. For example, in some embodiments, wiring extending through the wing cavity for providing data associated with operation or temperatures of coolant, fuel cells 102A, 102B or the like, to a controller or to a remote destination or for providing control signals for controlling pump speed, motors, fuel cells, or the like to destinations within the wing. Additionally, wiring providing electrical power from the fuel cells 102A, 102B to a motor or other system may be arranged in the wing cavity. In some embodiments, piping for providing fuel, such as hydrogen from hydrogen fuel cells, may be plumbed to regulators, hydrogen burning engines, or other components. In other embodiments, methanol, ethanol, diesel, coal or other fuel types may be used for fuel cells, and fuel cells using these fuel sources may be similarly cooled by an in wing cooling system using appropriate wiring, piping, or other features.

Figure 5A:
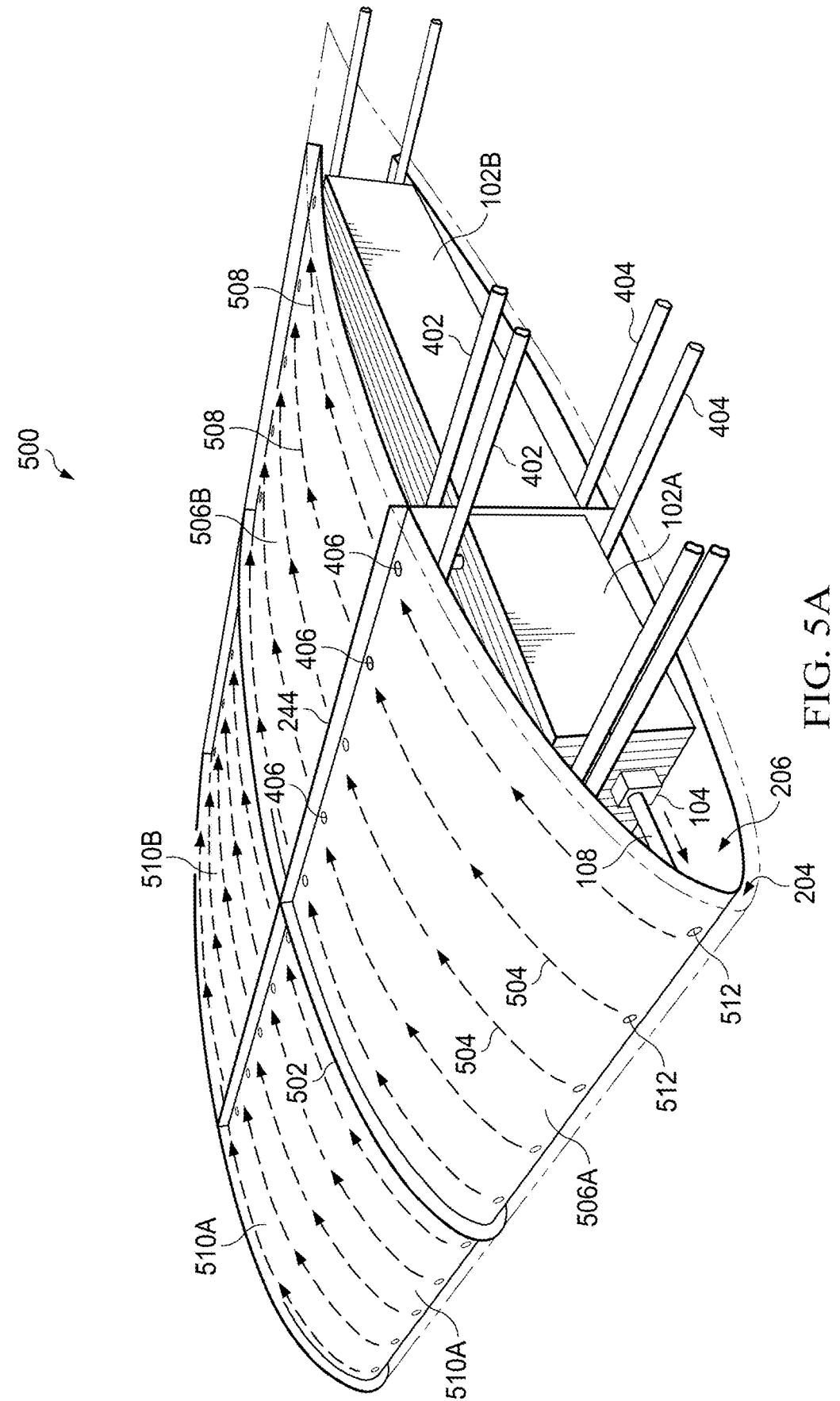
FIGS. 5A-5C are diagrams illustrating perspective views of an interior of a wing structure with a fuel cell cooling system according to some embodiments.
Figure 5B:
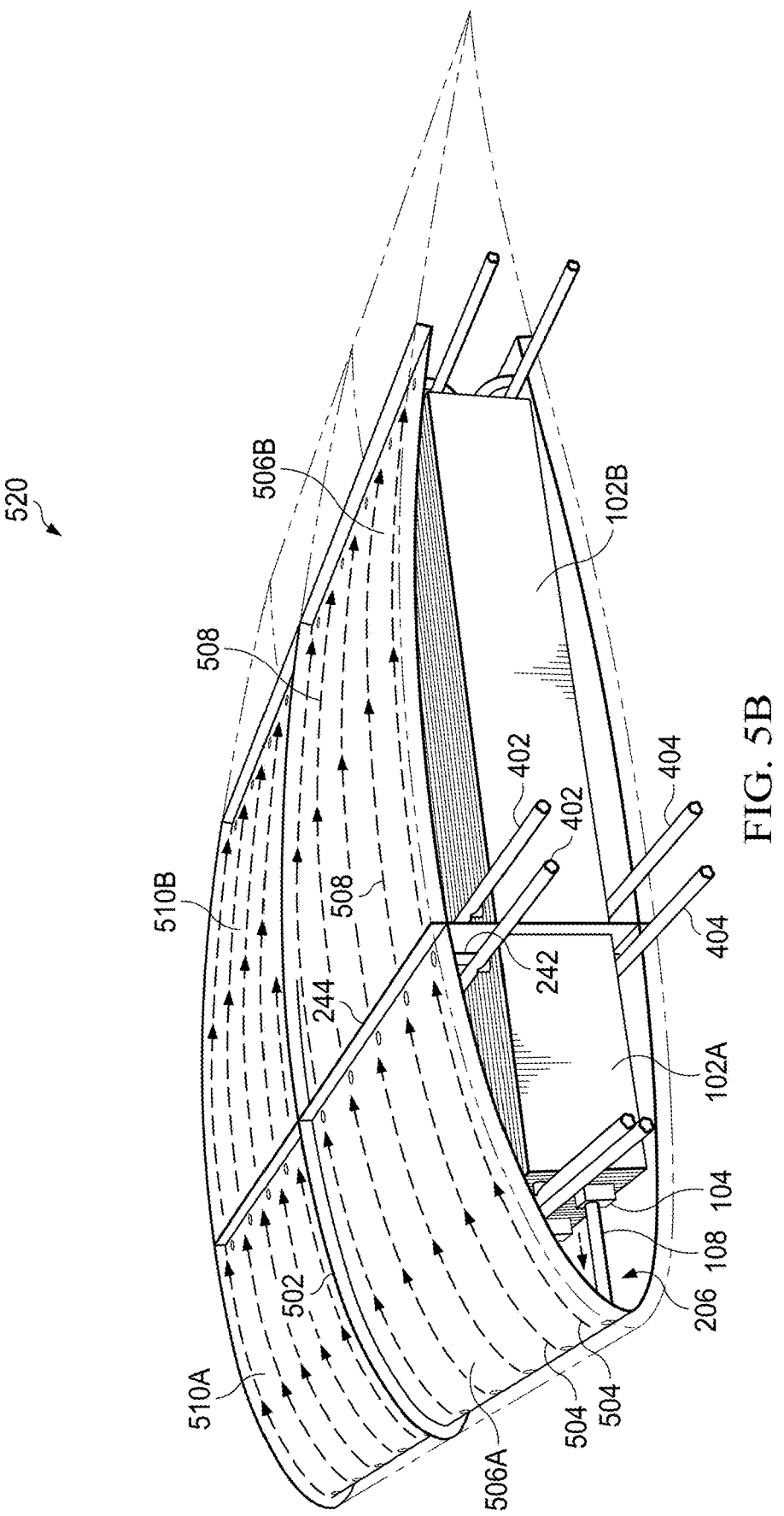
Figure 5C:
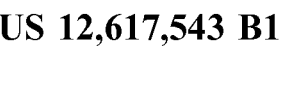

FIGS. 5A-5C are diagrams illustrating perspective views of an interior 500, 520, 540 of a wing structure with a fuel cell cooling system according to some embodiments. FIG. 5A is a diagram illustrating a top-front perspective view of an interior 500 of a wing structure with a fuel cell cooling system according to some embodiments. FIG. 5B is a diagram illustrating a top-side perspective view of an interior 520 of a wing structure with a fuel cell cooling system according to some embodiments. FIG. 5C is a diagram illustrating a bottom-side perspective view of an interior 540 of a wing structure with a fuel cell cooling system according to some embodiments. FIGS. 5A-5A show the wing structures and heat exchangers with the exterior of the wing removed to illustrate directions of coolant flow 504, 508 of coolant within fluid cavities 506A, 506B, 510A, 510B.

In some embodiments, a wing may have multiple sequestered or separated cooling systems. For example, a first fuel cell 102A stack may have an associated cooling system with a first fluid cavity 506A. A second fuel cell 102B stack may be separated from the first fluid cavity 506A and first fuel cell 102A stack by a support structure 244 and may have a cooling system with a second fluid cavity 506B. In some embodiments, the first fluid cavity 506A may be separated from the second fluid cavity 506B, in a longitudinal direction, by the support structure 244, or by another structure such as a separation structure, flange, tab, structure separate from the support structure 244, or the like. Similarly, the first fluid cavity 506A and second fluid cavity 506B may be separated, in a lateral direction, from another set of fuel cells and associated cooling systems with a third fluid cavity 510A and a fourth fluid cavity 510B. The first and second fluid cavities 506A, 506B may be separated from the third and fourth fluid cavities 510A, 510B by a separating structure 502. In some embodiments, the separating structure 502 is a rib that extends through the inner surface of the heat exchangers and provides support and shape to the exterior of the wing. In other embodiments, the separating structure is a flange, strut, metal element, or other structure that provides a fluid-tight separation between the cooling systems. Additionally, in order to completely separate the different fluid cavities 506A, 506B, 610, 510B, the support structure and separating structure 502 may be between, and seal against, the inner portion 206 and the inside or inner surface of the exterior of the wing. However, supply piping 402 and exhaust piping 404 may be routed through the wing cavity to provide common supply or exhaust to each fuel cell 102A, 102B, or a set of fuel cells 102A . . . 102B. Thus, there may be a set of supply piping 402 and exhaust piping 404 for multiple forward or first fuel cells 102A, and separate supply piping 402 and exhaust piping 404 for multiple rear or second fuel cells 102B.

In some embodiments, the coolant flow 504 for the front heat exchangers is from the leading edge toward the trailing edge. The coolant flow 504 for the front heat exchangers is generated by coolant pumps 104 pumping coolant through output piping 108 to the first fluid cavity 506A or third fluid cavity 510A through coolant openings 512 near the leading edge of the wing. The coolant flows through the front fluid cavities 206A, 510A, over the exterior surface of the inner portions 206 of the heat exchanger and adjacent to the exterior of the wing, and exits the heat exchanger through coolant openings 406 near the support structure 244. In some embodiments, the coolant flow 508 for the rear heat exchangers is also from front to back, with coolant entering the rear heat exchangers through coolant openings near the support structure 244 and exiting the rear heat exchangers through coolant openings nearer the trailing edge than the front coolant openings. While the illustrated embodiment shows the coolant flow 504 for the front heat exchangers and coolant flow 508 for the rear heat exchangers being in the same direction, the coolant flows 504, 508 may be in different directions depending on design requirements. For example, the coolant flow 508 for the rear heat exchangers may be from back-to-front when needed to assist in de-icing trailing edge control surfaces, other exterior features, or the like.

Figure 6:
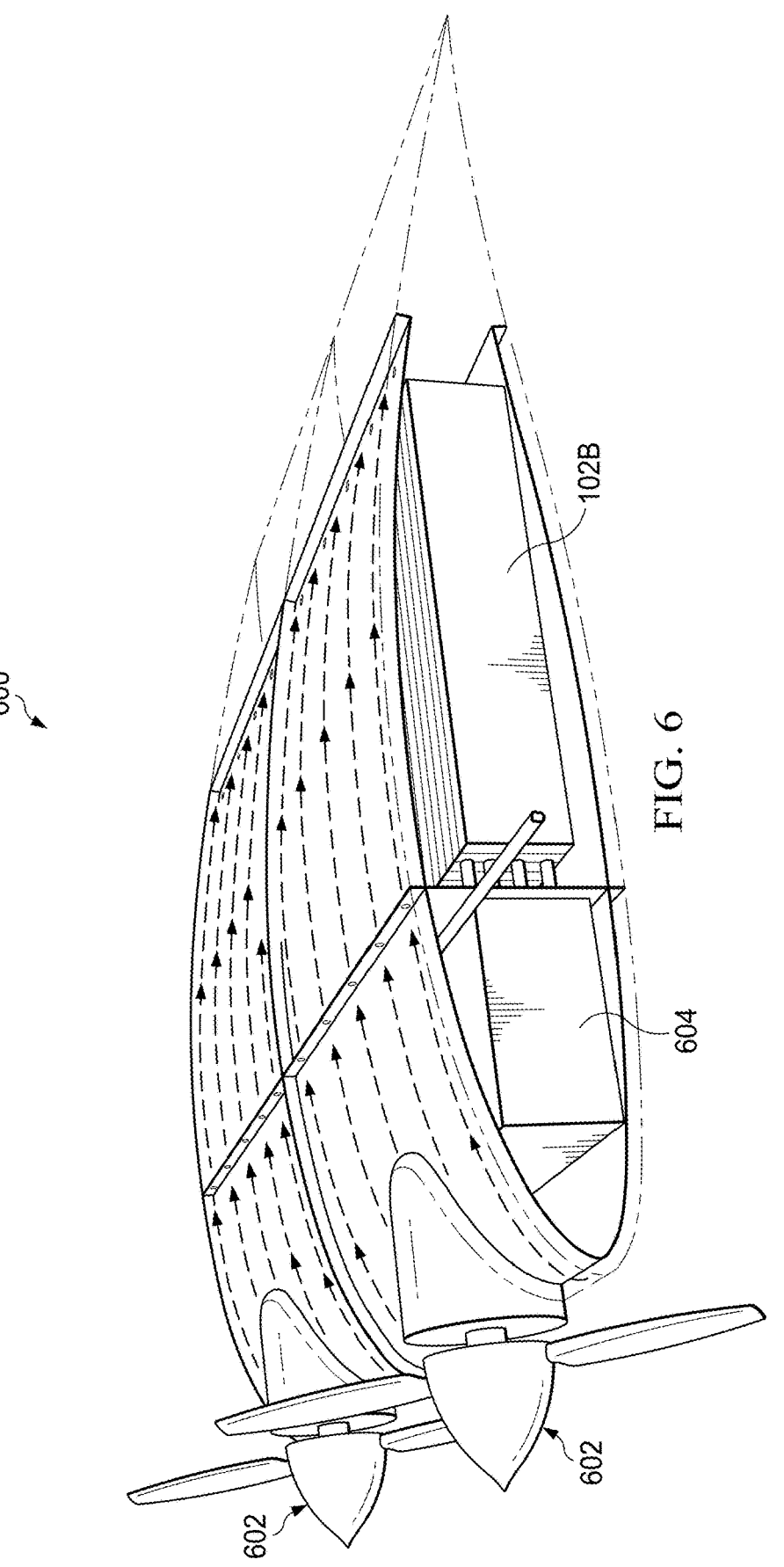
FIG. 6 is a diagram illustrating a perspective view of an interior of a wing structure with propulsion assemblies and a fuel cell cooling system according to some embodiments.

FIG. 6 is a diagram illustrating a perspective view of an interior of a wing structure with propulsion assemblies and a fuel cell cooling system according to some embodiments. Aircraft may use wing mounted propulsion assemblies 602 disposed at the leading edge of the wing. The heat exchanger fluid cavities may be formed around nacelles or other mounting structures of the propulsion assemblies, which may also have motors, propellers, or the like. Additionally, a fuel cell balance-of-plant (BoP) systems 604 may be disposed in the wing, and treated similarly to fuel cells, with cooling, where required, by the in-wing heat exchangers. Thus, a wing may have a BoP system 604, and fuel cells 102B, with in-wing heat exchangers for cooling the BoP systems 604 and fuel cells 102B. In some embodiments, the motors of the propulsion assemblies 602 may also be provided with in-wing cooling systems that are separate from or integrated with the cooling systems for the fuel cells 102B.

In some embodiments, the BoP systems 604 may include input air delivery and conditioning such as compressors, turbo compressors, blowers, pressure regulation valves, or the like, intercoolers, back pressure valves, air humidification systems or components, such as membrane humidifiers, condensers, water spray injectors, air recirculation pumps and related hardware, or the like. Additionally, the input air delivery and conditioning elements of the BoP systems 604 may include heat exchangers for intercooling, which may be integrated into the fuel cell cooling system. In some embodiments, the BoP systems 604 may include systems for handling hydrogen propulsion systems, including, but not limited to hydrogen delivery and conditioning that may include hydrogen evaporators or preheaters, which may be coupled to the fuel cell cooling system or have a dedicated cooling system, recirculation pumps and associated hardware, ejector-injector pumps, pressure regulation valves, water separators, or the like. Additionally, in some embodiments the BoP systems 604 may include systems for handling common exhaust, including oxidation catalysts used to burn excess hydrogen, turbine, or other exhaust handling components or treatment systems.

Figure 7:
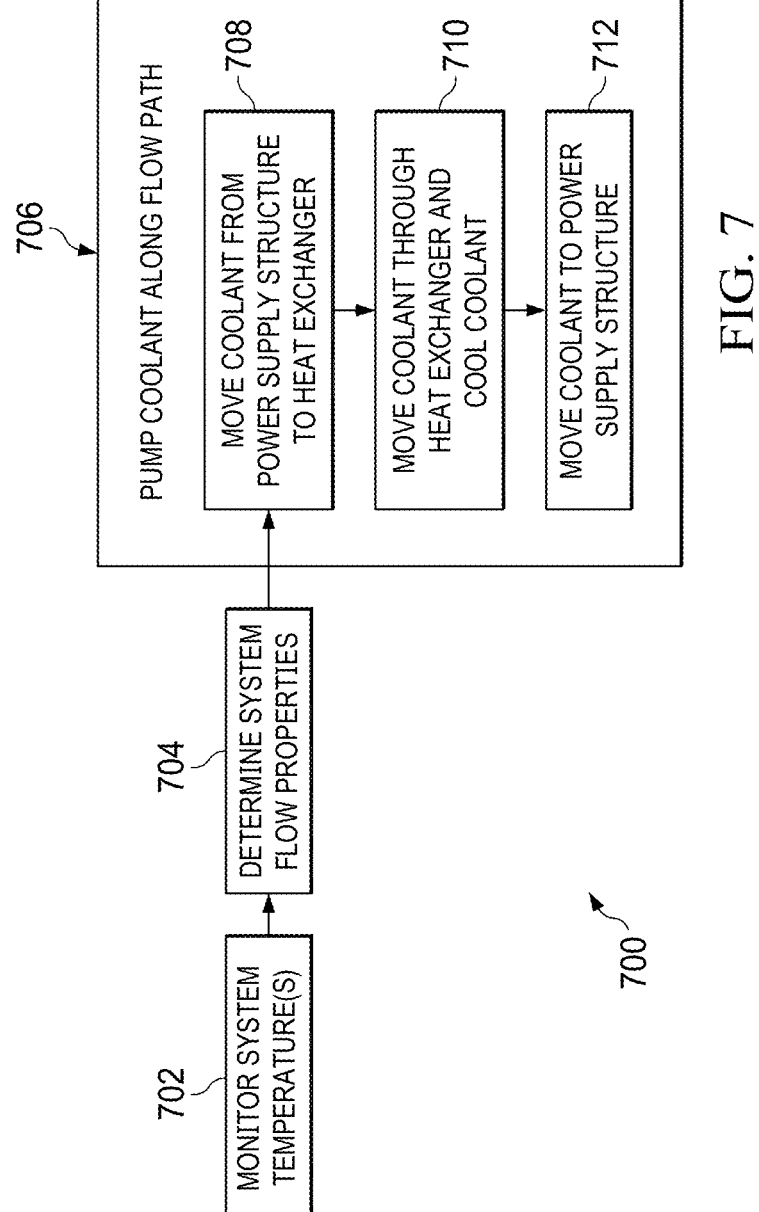
FIG. 7 is a flow diagram illustrating a method for using in-wing fuel cell cooling systems according to some embodiments.

FIG. 7 is a flow diagram illustrating a method 700 for using in-wing fuel cell cooling systems according to some embodiments. In some embodiments, in block 702, a system monitors temperatures within the system, such as temperatures of coolant, power supply structure, coolant pumps, exterior surfaces, or the like. The monitoring may be performed by a monitoring system such as a control system, flight control computer, dedicated cooling handling system, or the like, and the monitoring system may receive signals indicating the various system temperatures, health status data, performance data, or the like. In block 704, the monitoring system may determine one or more system flow properties. The monitoring system may set flow rates for different cooling systems based on measured data such as measured temperatures. For example, the monitoring system may send control signals for cooling systems of power supply structures that run hotter than others to increase the flow rate of coolant to increase cooling. In block 706, coolant is pumped along a flow path. In some embodiments, the coolant pump may pump coolant through the flow path to cool the coolant and power supply structures, providing cooling for an aircraft power system. Additionally, the pumping speed or flow rate of the coolant may be based on a command or signal from the monitoring system. Additionally, in some embodiments, pumping coolant may include, in block 708, moving coolant from a power supply structure to a heat exchanger. In some embodiments, the heat exchanger is disposed in a wing of the aircraft, and is in thermal contact with an exterior of the wing. In some embodiments, the heat exchanger extends, along an inner surface of the exterior, from an upper side of the wing, around a leading edge of the wing, to a lower side of the wing, and may form a heat exchanger cavity, with the power supply structure at least partially disposed in the heat exchanger cavity.

In block 710, coolant is moved through the heat exchanger, and the coolant is cooled. In some embodiments, moving the coolant through the heat exchanger cools the coolant and transfers heat in the coolant to the exterior surface for removal by airflow over the wing. In some embodiments, moving coolant through the heat exchanger comprises moving coolant into the heat exchanger near the leading edge and moving coolant in the heat exchanger toward the trailing edge along both the upper side and lower side first heat exchanger.

In block 712, the coolant is moved back to the power supply structure. The coolant may be moved back to the power supply structure after the coolant is cooled in the heat exchanger, providing cooling for the power supply structure.

An embodiment aircraft includes a wing having an exterior with an exterior surface, a first power supply structure disposed in the wing, an electric motor electrically connected to the first power supply structure, a first heat exchanger disposed in the wing, where the first heat exchanger is disposed adjacent to, and in thermal contact with, at least a portion of the exterior of the wing, where the first heat exchanger is configured to transfer heat to the exterior surface, and a first coolant pump in fluid communication with the first heat exchanger and the first power supply structure.

In some embodiments, the first heat exchanger extends, along an inner surface of the exterior, from an upper side of the wing, around a leading edge of the wing, to a lower side of the wing. In some embodiments, the first heat exchanger forms a first heat exchanger cavity, and the first power supply structure is at least partially disposed in the first heat exchanger cavity. In some embodiments, the wing includes a support structure extending from at least an interior side of the exterior at a lower side of the wing to an interior side of the exterior at an upper side of the wing, and the first power supply structure and the first heat exchanger are disposed between a leading edge of the wing and the support structure. In some embodiments, a second power supply structure is disposed in the wing between the support structure and a trailing edge of the wing, a second heat exchanger is disposed in the wing, where the second heat exchanger is disposed adjacent to, and in thermal contact with, at least a portion of the exterior of the wing, where the second heat exchanger is configured to transfer heat to the exterior surface, and a second coolant pump is in fluid communication with the second heat exchanger and the second power supply structure. In some embodiments, the first heat exchanger is separate from the second heat exchanger. In some embodiments, the second heat exchanger includes a first portion disposed at an upper side of the wing, and further includes a second portion that is disposed at a lower side of the wing, and that is separate from the first portion of the second heat exchanger. In some embodiments, the first power supply structure is a fuel cell.

An embodiment cooling system includes a first power supply structure, a first heat exchanger having a first inner portion configured to be disposed adjacent to a first portion of a wing exterior of a wing configured for use in flight of an aircraft, the wing having a wing exterior with an exterior surface, where the first inner portion at least partially bounds a first fluid cavity, and where the first power supply structure is in fluid communication with the first fluid cavity, and a first coolant pump configured to pump first coolant through the first fluid cavity to the first power supply structure, where pumping first coolant through the first fluid cavity causes the first heat exchanger to cool the first coolant.

In some embodiments, the cooling system structure of claim 9 further includes a second power supply structure, a second heat exchanger having a second inner portion configured to be disposed adjacent to a second portion of the wing exterior, where the second inner portion at least partially bounds a second fluid cavity, and where the second power supply structure is in fluid communication with the second fluid cavity, and a second coolant pump configured to pump second coolant through the second fluid cavity to the second power supply structure, where pumping second coolant through the second fluid cavity causes the second heat exchanger to cool the second coolant. In some embodiments, the first heat exchanger is separate from the second heat exchanger. In some embodiments, the second heat exchanger includes an upper second inner portion configured to be disposed at an inner surface of an upper side of the wing, and further includes a lower second inner portion that is configured to be disposed at an inner surface of a lower side of the wing, and that is separate from the first inner portion of the second heat exchanger. In some embodiments, the first heat exchanger has a shape conforming to an inner surface of the wing exterior from an upper side of the wing, around a leading edge of the wing, to a lower side of the wing. In some embodiments, the first heat exchanger forms a first heat exchanger cavity, and the first power supply structure is configured to be at least partially disposed in the first heat exchanger cavity. In some embodiments, the first power supply structure has a prismatic shape that roughly conforms to, and is spaced apart from, an interior surface of the first inner portion. In some embodiments, the cooling system structure further includes input piping connecting the first fluid cavity to a first end of the first power supply structure, where the first coolant pump is connected to a second end of the first power supply structure, and output piping connecting the first fluid cavity the first coolant pump.

An embodiment method includes providing cooling for an aircraft power system of an aircraft by causing a coolant pump to pump coolant along a coolant flow path, where pumping coolant along the coolant flow path includes moving, using the coolant pump, the coolant from a power supply structure to a heat exchanger, where the heat exchanger is disposed in a wing of the aircraft, and is in thermal contact with an exterior of the wing, moving the coolant through the heat exchanger, where moving the coolant through the heat exchanger cools the coolant and transfers heat in the coolant to the exterior surface for removal by airflow over the wing, and moving the coolant, after cooling the coolant, to the power supply structure.

In some embodiments, the heat exchanger extends, along an inner surface of the exterior, from an upper side of the wing, around a leading edge of the wing, to a lower side of the wing. In some embodiments, moving coolant through the heat exchanger includes moving coolant into the heat exchanger near the leading edge and moving coolant in the heat exchanger toward the trailing edge along both the upper side and lower side first heat exchanger. In some embodiments, the heat exchanger forms a heat exchanger cavity, and the power supply structure is at least partially disposed in the heat exchanger cavity.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An aircraft, comprising:

a wing having an exterior with an exterior surface;

a first power supply structure disposed in the wing;

an electric motor electrically connected to the first power supply structure;

a first heat exchanger disposed in the wing, wherein the first heat exchanger is disposed adjacent to, and in thermal contact with, at least a portion of the exterior of the wing, wherein the first heat exchanger is configured to transfer heat to the exterior surface, wherein the first heat exchanger forms a first heat exchanger cavity, and wherein the first power supply structure is at least partially disposed in the first heat exchanger cavity; and a first coolant pump in fluid communication with the first heat exchanger and the first power supply structure.

2. The aircraft of claim 1, wherein the first heat exchanger extends, along an inner surface of the exterior, from an upper side of the wing, around a leading edge of the wing, to a lower side of the wing.

3. The aircraft of claim 1, wherein the wing comprises a support structure extending from at least an interior side of the exterior at a lower side of the wing to an interior side of the exterior at an upper side of the wing; and wherein the first power supply structure and the first heat exchanger are disposed between a leading edge of the wing and the support structure.

4. The aircraft of claim 3, further comprising:

a second power supply structure disposed in the wing between the support structure and a trailing edge of the wing;

a second heat exchanger disposed in the wing, wherein the second heat exchanger is disposed adjacent to, and in thermal contact with, at least a portion of the exterior of the wing, wherein the second heat exchanger is configured to transfer heat to the exterior surface; and a second coolant pump in fluid communication with the second heat exchanger and the second power supply structure.

5. The aircraft of claim 4, wherein the first heat exchanger is separate from the second heat exchanger.

6. The aircraft of claim 4, wherein the second heat exchanger comprises a first portion disposed at an upper side of the wing, and further comprises a second portion that is disposed at a lower side of the wing, and that is separate from the first portion of the second heat exchanger.

7. The aircraft of claim 1, wherein the first power supply structure is a fuel cell.

8. A cooling system structure, comprising:

a first power supply structure;

a first heat exchanger having a first inner portion configured to be disposed adjacent to a first portion of a wing exterior of a wing configured for use in flight of an aircraft, the wing having a wing exterior with an exterior surface, wherein the first inner portion at least partially bounds a first fluid cavity, wherein the first heat exchanger has a shape conforming to an inner surface of the wing exterior and extends from an upper side of the wing, around a leading edge of the wing, to a lower side of the wing, and wherein the first power supply structure is in fluid communication with the first fluid cavity; and a first coolant pump configured to pump first coolant through the first fluid cavity to the first power supply structure, wherein pumping first coolant through the first fluid cavity causes the first heat exchanger to cool the first coolant.

9. The cooling system structure of claim 8, further comprising:

a second power supply structure;

a second heat exchanger having a second inner portion configured to be disposed adjacent to a second portion of the wing exterior, wherein the second inner portion at least partially bounds a second fluid cavity, and wherein the second power supply structure is in fluid communication with the second fluid cavity; and a second coolant pump configured to pump second coolant through the second fluid cavity to the second power supply structure, wherein pumping second coolant through the second fluid cavity causes the second heat exchanger to cool the second coolant.

10. The cooling system structure of claim 9, wherein the first heat exchanger is separate from the second heat exchanger.

11. The cooling system structure of claim 9, wherein the second heat exchanger comprises an upper second inner portion configured to be disposed at an inner surface of an upper side of the wing, and further comprises a lower second inner portion that is configured to be disposed at an inner surface of a lower side of the wing, and that is separate from the first inner portion of the second heat exchanger.

12. The cooling system structure of claim 8, wherein the first heat exchanger forms a first heat exchanger cavity, and wherein the first power supply structure is configured to be at least partially disposed in the first heat exchanger cavity.

13. The cooling system structure of claim 11, wherein the first power supply structure has a prismatic shape and is spaced apart from an interior surface of the first inner portion.

14. The cooling system structure of claim 8, further comprising:

input piping connecting the first fluid cavity to a first end of the first power supply structure, wherein the first coolant pump is connected to a second end of the first power supply structure; and output piping connecting the first fluid cavity the first coolant pump.

15. A method, comprising:

providing cooling for an aircraft power system of an aircraft by causing a coolant pump to pump coolant along a coolant flow path;

wherein pumping coolant along the coolant flow path comprises:

moving, using the coolant pump, the coolant from a power supply structure to a heat exchanger, wherein the heat exchanger is disposed in a wing of the aircraft, and is in thermal contact with an exterior of the wing, and wherein the heat exchanger extends, along an inner surface of the exterior, from an upper side of the wing, around a leading edge of the wing, to a lower side of the wing;

moving the coolant through the heat exchanger, wherein moving the coolant through the heat exchanger cools the coolant and transfers heat in the coolant to the exterior for removal by airflow over the wing; and moving the coolant, after cooling the coolant, to the power supply structure.

16. The method of claim 15, wherein moving coolant through the heat exchanger comprises moving coolant into the heat exchanger near the leading edge and moving coolant in the heat exchanger toward a trailing edge of the wing along both the upper side and lower side.

17. The method of claim 15, wherein the heat exchanger forms a heat exchanger cavity, and wherein the power supply structure is at least partially disposed in the heat exchanger cavity.

* * * * *